Jan. 10, 1939.   J. P. GALTNEY   2,143,240
BEARING
Filed March 16, 1936
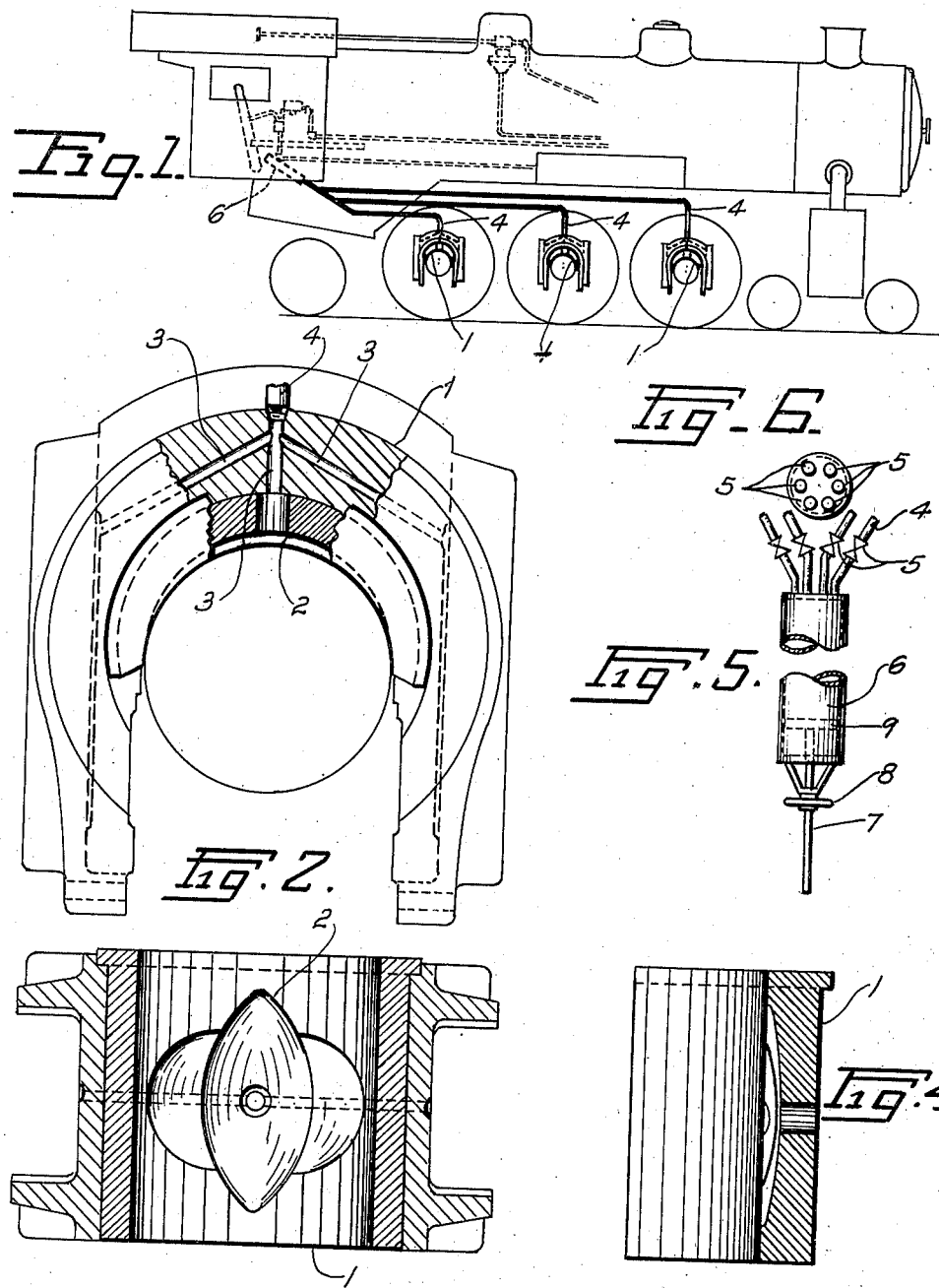

Patented Jan. 10, 1939

2,143,240

UNITED STATES PATENT OFFICE 2,143,240

BEARING

James Pierce Galtney, Birmingham, Ala.

Application March 16, 1936, Serial No. 69,048

3 Claims. (Cl. 308—79.1)

My invention relates to a lubricating system in which a plurality of bearings are lubricated from a common source of lubricant, to which pressure may be applied as desired, and from which common source a plurality of leads to the bearings are provided with valves on the leads for the purpose of cutting any or all off as may be desired. The invention also comprises a special type of brass bearings for use in the main journal boxes of the axles of the drive wheels of a locomotive.

The main object of the invention is to provide a common source of lubricant in the cab of the locomotive and within reach of the engineer so as pressure may be applied to the lubricant as may be desired. From the common source of supply there is a direct lead by rigid and flexible connection to each bearing. Adjacent the main source of supply each lead is provided with a valve so as the engineer may close or open same as desired. This is an important feature because in case any bearing should show signs of overheating the engineer could give same a liberal supply of lubricant by leaving that particular valve open and closing the other valves on the other leads from the common source of supply.

The brass bearings to be used in my system are provided with cavities or recesses for the purpose of always having a supply of lubricant adjacent the revolving axle. The depth of the cavity and the spread of same on top of the revolving axle depends on the weight to be carried by the bearing. On locomotives having eight sets of driving wheels the cavity in a brass bearing would have a greater spread because more of the bearing face could be cut away. Otherwise where a locomotive is provided with only two sets of driving wheels the brass bearings would have to retain most of their bearing quality to carry the load and the grease cavity and spread would be less. Also the grease cavity may be cut out more on one side than on the other.

The mechanical features of the invention are illustrated in the accompanying drawing in which Fig. 1 is a skeleton view of a railway locomotive showing brass bearings and leads to same in place; Fig. 2 is an elevation of a journal with a brass bearing in place over the axle partly cut away; Fig. 3 is a plan view of the bottom face of the upper brass bearing in place in a journal; Fig. 4 is a sectional view of a brass bearing cut through its center parallel with the axle and part of the axle on same; Fig. 5 is a plan view of the cylinder for containing the lubricant with the leads partly shown and Fig. 6 is an end view of the cylinder.

Similar reference numerals refer to similar parts throughout the several views.

By reference to the figures it will be observed that 1 indicates the upper brass bearing; 2 is the main cavity in same; 3 is a channel for passing lubricant to the sides of the journal box; 4 indicates the main tubes that connect with the source of lubricant supply; 5 indicates valves in tubes 4 near cylinder 6, which said outlet tubes may be any desired number to correspond with the number of bearings on the locomotive drive wheels; 6 is a cylinder for containing the lubricant; 7 is a piston rod for operating piston 9. This piston rod may be operated by hand wheel 8 assuming that it may be provided with a thread to pass through a thread in the wheel; also the piston 7 may be operated by any other power.

I reserve the right to manufacture my mechanical parts out of any material that may be suitable for the purpose. In the main leads from the common source of lubricant to the various bearings I necessarily must have certain portions of same flexible so as to accommodate the spring movement and shifting position of the main body of the locomotive with reference to its running mechanism. While I prefer to make my bearings of brass, I reserve the right to use any other material for the purpose so long as I remain within the spirit and scope of the invention.

Having described my invention I claim:

1. A brass bearing of the class described for railway locomotives, the contact face of the bearing having two elliptic cavities for containing lubricant, one of said elliptic cavities having its major axis parallel with the axis of the axle, and the other elliptic cavity having its major axis at a ninety degree angle across the center of the other cavity, a lubricant passage way leading from the top of the center of said crossed cavities upwardly to a main source of lubricant, a lubricant passage way connected to and leading from each side of said upward passage way to both sides of the brass bearing and disposed to supply lubricant between the sides of the bearing and the bearing box.

2. A bearing for railway locomotives and other bearing purposes, the contact face of the bearing having two approximately elliptic shaped cavities for holding lubricant in close proximity to the axle, one of said cavities having its major axis parallel with the axis of the axle and the other cavity having its major axis at a ninety degree angle across the center of the first cavity, a lubricant duct leading upwardly from the top center of said crossed cavities to a main source of lubricant, lubricant ducts leading from opposite sides of said upward duct to both sides of the bearing and disposed to supply lubricant between the sides of the bearing and the bearing box.

3. In a journal box a journal brass, the contact face of the brass having two approximately elliptic shaped cavities for holding lubricant in close proximity to the axle, one of said cavities having its major axis parallel with the axis of the axle and the other cavity having its major axis at a ninety degree angle across the center of the first cavity, a lubricant duct with three branch ducts disposed to supply lubricant to said crossed cavities and both sides of the journal brass where same come in contact with the journal box.

JAMES PIERCE GALTNEY.